UNITED STATES PATENT OFFICE.

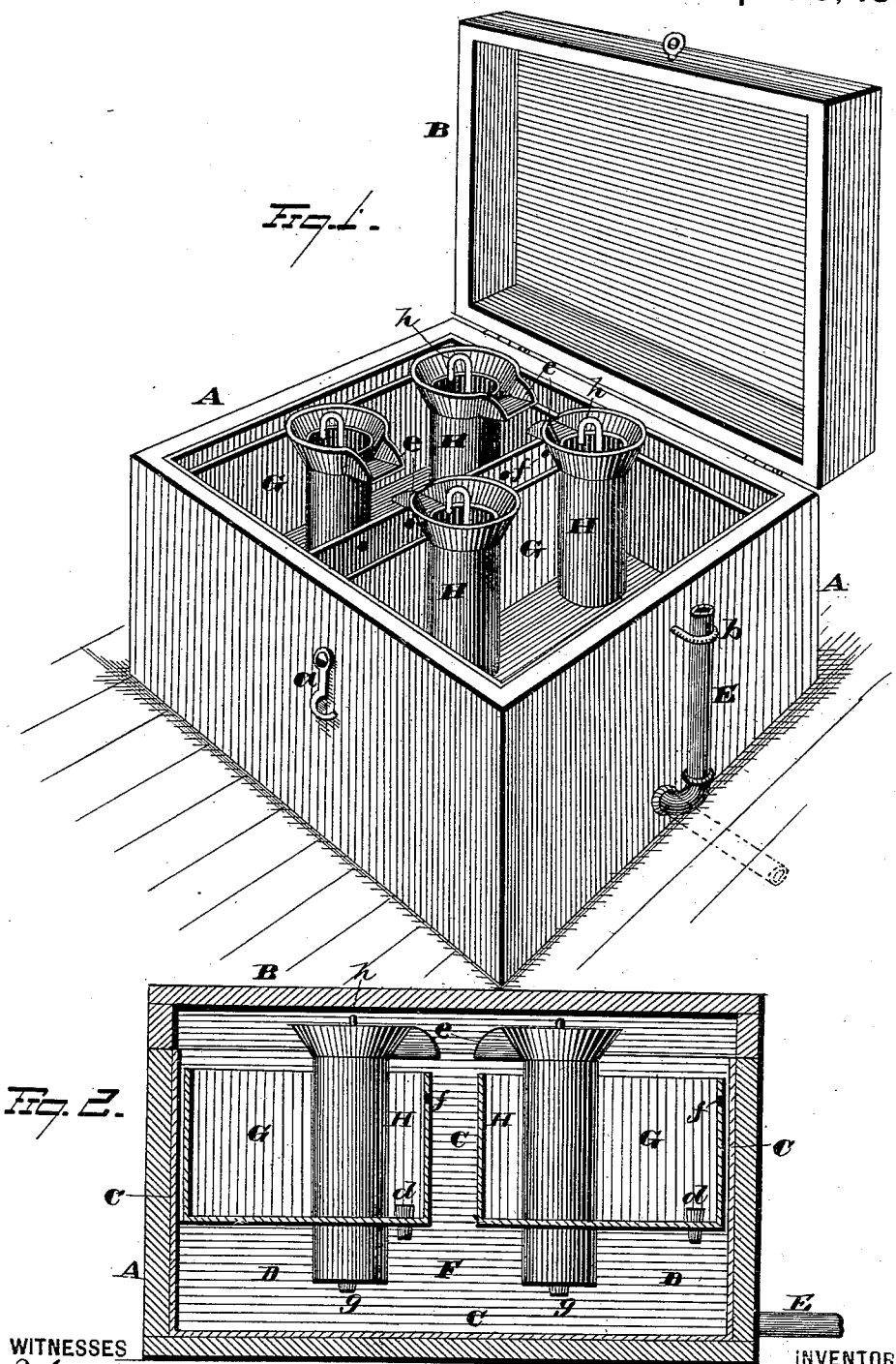

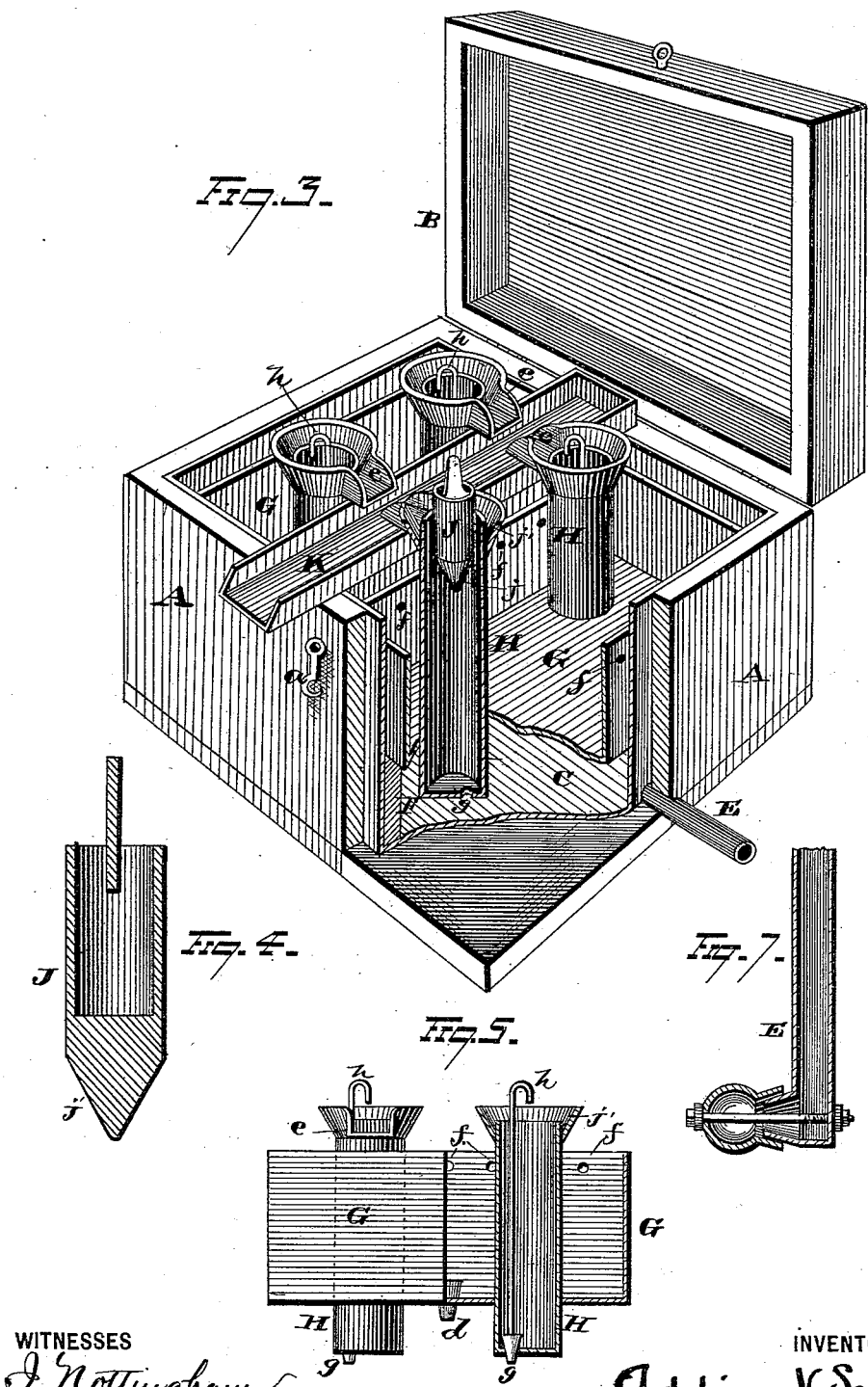

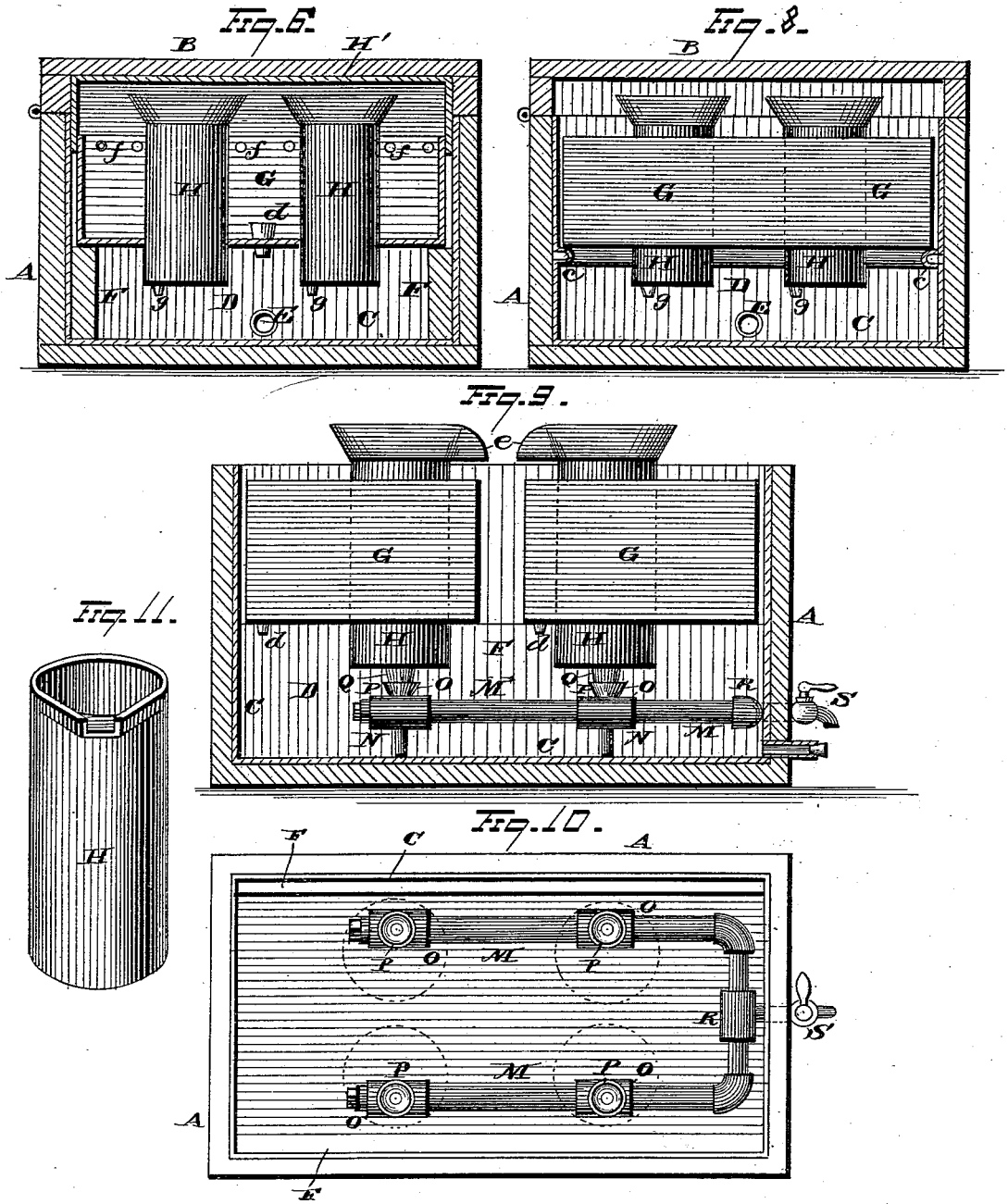

ADDISON V. SANFORD, OF BINGHAMTON, N. Y., ASSIGNOR OF ONE-HALF OF HIS RIGHT TO WILLIAM E. LINCOLN, OF WARREN, MASS.

CREAM-RAISING APPARATUS.

SPECIFICATION forming part of Letters Patent No. 226,205, dated April 6, 1880.

Application filed September 23, 1879.

*To all whom it may concern:*

Be it known that I, ADDISON V. SANFORD, of Binghamton, in the county of Broome and State of New York, have invented certain new and useful Improvements in Cream-Raising Apparatus; and I do hereby declare the following to be a full, clear, and exact description of the invention, such as will enable others skilled in the art to which it pertains to make and use it, reference being had to the accompanying drawings, which form a part of this specification.

My invention relates to an improvement in cream-raising apparatus. Heretofore apparatus of many different styles of construction and arrangement of parts have been produced for the purpose of raising cream, but none have as yet been provided which have been free from serious objections. In one style of apparatus of this class the milk-receptacles have been wholly or partially submerged in cold water; but in such form of apparatus great difficulty is experienced in handling the milk-cans, as they must be lifted bodily out of the tank in which they are placed, which operation not only requires the expenditure of considerable strength and labor, but disturbs the cream in handling the can or receptacle.

Again, the milk-receptacles have been made elongated in shape and secured midway to the bottom of an ice or water receptacle, the parts being so arranged that the warm atmosphere may come in direct contact with the lower portion of the can or receptacle, while the upper portion is subjected to cold from the surrounding ice or ice-water.

Apparatus of the latter construction has been found objectionable in use, for the reason that a great amount of ice is necessitated in extracting the heat from the milk when it is allowed to continually absorb the heat from the outer air.

The object of my invention is to obviate the objections above noted, and to provide an apparatus for raising cream wherein the upper and lower portions of the milk-receptacles shall be subjected to a slight difference of temperature to insure reverse currents in the milk-receptacle, and yet accomplish the desired object of the separation of the cream without an undue waste of cold or ice.

A further object of my invention is to provide means for skimming the cream from the surface of the milk without removing the milk at the same operation.

To these ends my invention consists, in an apparatus for raising cream, of the construction and arrangement of parts hereinafter described, and pointed out in the claims.

In the accompanying drawings, Figure 1 is a view, in perspective, of my improved apparatus. Fig. 2 is a side elevation of the same, with the front of the cabinet or box removed to show the interior thereof. Fig. 3 is a view, in perspective, of the apparatus and sectional view of one of the milk-cans, with cream-displacer located therein and the cream-conveyer in place, showing the position of the several parts for skimming the cream. Fig. 4 is a detached view of the cream-displacer. Fig. 5 is a detached view of one of the ice-receptacles and the milk-cans connected therewith, one of the latter being represented in vertical section to show the discharge-valve. Fig. 6 is a modified form of the construction of cabinet to provide for the discharge of vapors resulting from the condensation of gases or animal vapors arising from the milk. Fig. 7 is a modified form of adjustable discharge-pipe. Fig. 8 is a modified construction of metal-lined tank. Figs. 9, 10, and 11 are modifications.

A is the cabinet, which is made of wood, the cover B having any suitable catch or locking device *a* connected therewith, for securing the same to the body of the cabinet. The inner surface of the body of the cabinet is lined with sheet metal, C, as galvanized iron or tin or zinc, the joints of which are made water-tight, thus forming a water-tight tank, D.

To the lower portion of metal-lined tank D is secured one end of a pipe or hose, E, which latter is preferably made of rubber, the outer end of which, when the pipe is not in use, is raised and secured by a staple, *b*, or other device to the outer surface of the cabinet.

To the lower sides of the tank are secured the cleats F, for supporting the removable ice and milk receptacles. Instead of attaching separate cleats F to the interior of the tank, the sheet metal forming the sides may have a rib, *c*, formed therein by passing the sheet through proper rollers, and thus provide a ledge for supporting the ice-receptacles without rendering it necessary to employ separate cleats for such purpose.

When a single strip of sheet metal will suffice for forming the sides and ends of the tank, the rib c may extend entirely around the interior of said tank, and the rib be readily formed by passing the entire sheet through suitable rolls, plain spaces being provided at the corners to allow of the bending of the metal in the required form.

G are the water-tight ice-receptacles. Each receptacle G is made of the proper length, so that the ends thereof will seat upon the cleats in the tank D, and of the proper width to snugly fit in the tank.

I have represented my improved apparatus as being provided with two such receptacles; but I do not limit myself to this particular number, as but one or several may be used without departing from my invention.

The bottom of each of the ice-receptacles G is provided with a plug, faucet, or valve, d, for drawing off the water when desired.

H represents the milk-receptacles. They are preferably of cylindrical form, and are secured within the bottom of the ice-receptacle, so that the lower portion of the milk cans or receptacles will project a short distance below the ice-receptacle, and their upper ends also extend above the walls of said ice-receptacle.

The upper ends of the milk-receptacles are furnished with spouts e, for discharging the cream, as will hereinafter be explained.

The upper edge of the ice-receptacle is furnished with a row of perforations, f, to limit the height of the water accumulating therein and cause the overflow to be evenly distributed throughout the entire width of the tank.

Each of the milk-receptacles is provided with a valve or plug, g, fitting in an opening in the bottom thereof, said valve or plug having a stem, h, attached thereto, which extends upwardly, to be raised by the attendant as it is desired to draw off the contents of the milk-receptacle.

J is a cream-displacer, and is constructed with its lower end, j, of conical form, that it may enter the cream and force it outwardly toward the sides of the milk-receptacle. Cream-displacer J is of less diameter than the milk-receptacle, that an annular space may be provided between such parts to allow the cream to rise as the displacer is inserted in the milk, and flow into the gutter j', extending around the top of the milk-receptacle, and from thence through the spout e.

K is a cream-conveyer, and is constructed to be inserted between the spouts of the milk-receptacle, so that the spouts will project over and discharge the cream into said conveyer K.

Having described the construction and arrangement of the several parts of my improved apparatus, I will now proceed to describe its operation. The parts being in place, the ice-receptacles are filled with ice and the milk poured into the milk-receptacles. The cover of the cabinet is then closed, or it may be left open, if desired. The ice around the upper portion of the milk-receptacle operates to extract a portion of the heat from the milk in the upper portion of the milk-receptacle, which results in the separation of a portion of the cream from the milk thus cooled, the cream rising in the milk-receptacle above the level of the ice-water surrounding the same, the milk-receptacles being extended above the ice-receptacle a sufficient distance to allow for said operation. As the milk becomes cooled its specific gravity is increased and it falls to the bottom of the receptacle, displacing warmer milk contained in the lower portion of the receptacle, which rises and is cooled, thus parting with a portion of its cream, and then descends to the bottom of the milk-receptacle. Thus continuous ascending and descending currents of milk of different degrees of temperature are formed in the milk-receptacle, and the cream is constantly being separated from the milk until the operation has been continued a sufficient length of time to insure the most perfect and complete results.

The ice in the ice-receptacle not only serves to reduce the temperature of the milk in the upper portion of the milk-receptacle, but it is also caused to materially reduce the temperature of the milk in that portion of the milk-vessel which extends below the ice-receptacle. This result is effected by the employment of the metal tank D, within which the lower portions of the milk-receptacles are located.

It will be observed that the upper portion of said tank is covered by the ice-receptacles, and hence the air in the tank is materially reduced in its temperature; hence, although the temperature of the air in the tank is higher than that of the water in the ice-receptacle, and some difference of temperature is necessitated to cause the reverse currents in the milk-receptacle, yet there is not a sufficient difference to cause any undue waste of cold, as is the case when the lower portions of the milk-receptacles are subjected to the action of the warm atmosphere.

After the cream has been separated from the milk the cream-conveyer is inserted between the spouts of the milk-receptacles, and a cream-pail placed beneath the outer or discharge end of said conveyer. The cream-displacer J is then inserted in the milk-receptacle. The lower end of the displacer, being conical in form, serves to force the cream outwardly toward the sides of the milk-receptacle, and as the displacer J operates to displace a portion of the milk the latter will rise and float the cream into the gutter j', formed around the upper end of the milk-receptacle, thus causing the cream to flow through the spout into the conveyer, and from thence into the pail or other vessel. After the cream has been floated from one vessel the cream-displacer is inserted in another milk-receptacle and the operation continued until the cream has been removed from all of the several milk-receptacles in the cabinet. The valves in the lower portions of the milk-receptacles are then raised, allowing the skim-milk to flow into the tank D, from whence it is drawn off through the discharge tube or pipe connected with the tank.

When it is desired to cleanse the ice-receptacles the water is drawn therefrom by removing the valve or plug in the bottom of the ice-receptacle and allowing the water to flow into the tank, thus completely cleansing the latter from all traces of milk allowed to enter therein. The overflow of the ice-receptacles also enters the tank, and is drawn therefrom, though a sufficient quantity of water is allowed to remain in the bottom of the tank, while the milk is set to form a water-seal above the discharge-opening to prevent the ingress of warm air to the tank, the discharge-pipe serving as a water-trap to prevent the entrance of warm air to the interior of the tank. The water is all drawn from the tank before the skim-milk is allowed to flow therein.

If desired, the rubber discharge tube or pipe may be dispensed with and a jointed metal pipe, as illustrated in Fig. 7, may be used in lieu thereof. Again, when it is desired to keep the cover of the cabinet closed during the employment of my apparatus, the gases or animal vapors rising from the milk may be condensed and conveyed away by means of the appliance illustrated in Fig. 6. In such construction the cover is lined with sheet metal, $k$, and provided with flanges which extend downward into the tank D, whereby the vapors that rise from the milk are condensed and conveyed into the tank.

In Figs. 9 and 10 I have represented an arrangement of parts for drawing off the milk from the cans through connecting discharge-pipes.

M represents a pipe suitably supported on standards N or other devices. Pipe M is provided with T-couplings O at points beneath each of the cans in the cabinet. The T-couplings O are each furnished with funnel-shaped receptacles P, within which are received the tapering discharge-nozzles Q, secured to the lower ends of the cans.

Pipe M is arranged to connect with all the cans in the cabinet, as illustrated in Fig. 10, and is provided with a discharge branch pipe, R, which projects through the cabinet, said discharge branch pipe being furnished with a suitable valve or faucet, S.

This construction of parts is desirable when it is desired to maintain the temperature in the tank D at a low degree, as the cold water which flows into the tank may be allowed to remain therein and the milk drawn off through the discharge-pipe, instead of first drawing off the cold water and discharging the milk into the tank, and then drawing it off, as hereinbefore described.

Instead of forming a gutter around the upper end of the milk-receptacle, the spout may be made to extend outwardly a sufficient distance on opposite sides of the same to allow of the escape of the cream, as illustrated in Fig. 11 of the drawings.

It is evident that slight changes in the form or construction of the parts of my improved apparatus may be resorted to without departing from the spirit of my invention, and hence I would have it understood that I do not limit myself to the exact construction shown and described, though I make no claim to a milk-cooler in which the upper portion of the milk-receptacle is subjected to cold and the lower portion to the direct contact or action of the outer atmosphere; and, further, I make no claim to a milk-cooler wherein the lower portion of the milk-receptacle is submerged in cold water.

Having fully described my invention, what I claim as new, and desire to secure by Letters Patent, is—

1. In a cream-raising apparatus, the combination, with a water-tight metal-lined tank, of an ice-receptacle having a vertically-elongated milk-receptacle secured between its upper and lower ends to the bottom of the ice-receptacle, and the latter supported within the upper portion of the metal tank, whereby the upper portion of the milk-receptacle is subjected to the direct contact of ice or ice-water and the lower portion to the direct contact of cold air, substantially as set forth.

2. In a cream-raising apparatus, the combination, with a vertically-elongated milk-receptacle provided at its upper end with a spout and gutter, the latter extending partially or completely around the upper edge of the receptacle, of a cream-displacer consisting in a device of less diameter than the milk-receptacle and constructed with its lower end of conical form, substantially as set forth.

3. In a cream-raising apparatus, the combination, with a series of vertically-elongated milk-receptacles, each provided at its upper end with a spout and gutter, the latter extending partially or entirely around the upper edge of the receptacle, of a cream-conveyer adapted to be inserted between and beneath the several discharge-openings of said spouts, substantially as set forth.

4. In a cream-raising apparatus, the combination, with a tight metal-lined tank and an ice-receptacle located in the upper portion of said tank, of a vertically-elongated milk-receptacle (one or more) secured between its upper and lower end to the bottom of the ice-receptacle, the upper end of said milk-receptacle being provided with a gutter and a spout, substantially as set forth.

In testimony that I claim the foregoing I have hereunto set my hand and seal this 18th day of September, 1879.

ADDISON V. SANFORD. [L. S.]

Witnesses:
LOWELL GILMORE,
JNO. C. FRENCH.